July 5, 1960  H. C. PLUMMER  2,943,607
POWER ACTUATED PRESSURE MEASURING AND INDICATING DEVICE
Filed March 25, 1957
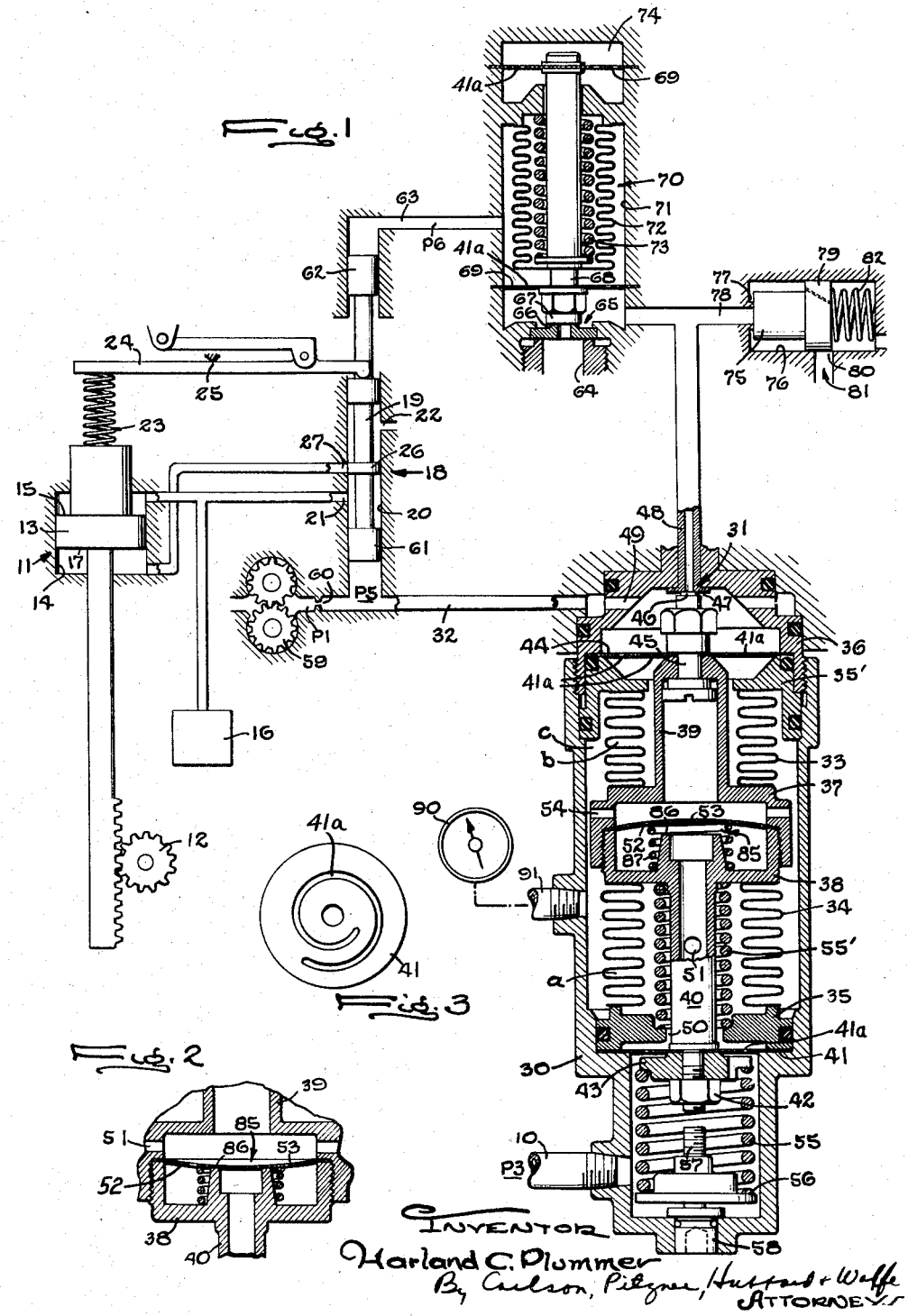
INVENTOR
Harland C. Plummer
By Carlson, Pitzner, Hubbard & Wolfe
ATTORNEYS

United States Patent Office 2,943,607
Patented July 5, 1960

2,943,607

POWER ACTUATED PRESSURE MEASURING AND INDICATING DEVICE

Harland C. Plummer, Rockford, Ill., assignor to Woodward Governor Company, Rockford, Ill., a corporation of Illinois Filed Mar. 25, 1957, Ser. No. 648,412

8 Claims. (Cl. 121—41)

This invention relates to a device for measuring pressure changes in a gaseous medium to control a power actuator and position an output member accurately in proportion to the gas pressure changes.

One object is to utilize a flexible diaphragm in sensing gaseous pressure of relatively high magnitude without subjecting the diaphragm to equally high pressure differentials.

Another object is to convert the gas pressure changes into corresponding changes in the pressure of a liquid governing the operation of a power servo.

A more detailed object is to subject a pressure sensing bellows on one side to the gas pressure to be measured and on the other side to a liquid whose pressure is varied automatically in accordance with the variations in the gas pressure.

A further object is to sense the gas pressure changes by a flexible bellows associated with a second bellows which is rendered operative in the event of failure of the first bellows.

The invention also resides in the novel manner of varying and sensing changes in the pressure of the liquid medium and in transferring the control of such pressure changes from one bellows to the other.

Other objects and advantages of the invention will become apparent from the following detailed description taken in connection with the accompanying drawings, in which Figure 1 is a schematic view and hydraulic circuit diagram of a pressure measuring device embodying the novel features of the present invention.

Fig. 2 is a fragmentary view of a part of Fig. 1 showing a different position of the parts.

Fig. 3 is a detail of one of the parts.

In the form shown in the drawings for purposes of illustration, the improved measuring device operates to sense changes in the pressure P3 (for example 0 to 300 p.s.i.) of a gaseous medium in the conduit 10 and to control the operation of a power servo 11 and position a driven element 12 thereof accurately in accordance with the magnitude of the prevailing pressure relative to a given reference pressure. Herein, the servo is of the hydraulic type with one area 15 subjected to a constant pressure from a liquid source 16 and a larger area 17 to which pressure fluid from the source 16 is admitted or from which liquid is drained under the control of a valve 18. The multiple land plunger 19 of the latter is slidable in a sleeve 20 having ports 21 and 22 respectively in continuous communication with the pressure source 16 and a low pressure or drain area. Each movement of the servo piston is fed back to the valve plunger through a coiled spring 23 and a lever 24 fulcrumed at 25 so that the position of the actuated element 12 always corresponds precisely to the force on the valve plunger.

In the arrangement disclosed, the piston 13 is held in fixed position when the land 26 is centered relative to the port 27 as shown in Fig. 1. Upon raising of the plunger 19, pressure fluid from the source 16 is admitted to the lower end of the cylinder 14 thus raising the piston until the plunger has been recentered through the spring 23 and the lever 24. Conversely, when the plunger is lowered below the port 27, fluid escapes from the lower end of the cylinder 14 and the piston moves downwardly until the plunger has been returned to neutral position.

In accordance with the present invention, gas pressure changes in the pipe 10 are sensed by a diaphragm enclosed in a casing 30 and arranged to actuate a valve 31 by which such changes are converted into corresponding changes in the pressure, hereinafter designated P5, of liquid in a passage 32 to which the servo control device or valve 18 responds. For a purpose to appear later, the diaphragm comprises two axially compressible bellows 33 and 34 arranged end to end within the casing with their remote ends soldered or otherwise sealed to rings 35 and 35' which are securely held in opposite ends of the casing. Herein the ring 35' is clamped against an internal shoulder by a cap 36 screwed into the casing end. The adjacent ends of the two bellows are sealed as by solder to heads 37 and 38 threaded together and integral with the adjacent ends of alined tubes 39 and 40 which project toward and loosely through the rings 35 and 35'.

The outer end of the tube 40 projects through a disk 41 (Fig. 3) having an opening therethrough in the form of a spiral groove 41$^a$. The outer periphery of the disk is clamped between the ring 35 and a shoulder on the casing. A nut 42 threaded onto the tube end acts through a washer 43 to clamp the disk center against a shoulder on the tube 40, the latter being thus guided for axial movement. In a similar way, the outer end of the tube 39 is clamped against the center of a disk 44 apertured like the disk 41 and secured around its periphery to the casing 30, the tube thus being guided axially.

The clamping of the disk 44 is effected by a bolt 45 whose flat outer end 46 in this instance constitutes the movable member of the valve 31. This member coacts with the valve seat 47 formed on the inner headed end of an outlet tube 48. The space within the casing and around the valve communicates through holes 49 with the passage 32 and through the spiral grooves 41$^a$ of the disk 44 with the interior of the bellows 33 which thus remains filled at all times with liquid at the controlled pressure P5.

The space within the bellows 34 and normally the space surrounding both bellows 33 and 34 are subjected to the gas pressure P3 to be measured. Thus, the pipe 10 extends into the closed end of the casing 30 which communicates through the groove 41$^a$ in the disk 41 and a clearance 50 with the interior of the bellows 34. Through a hole 51 in the tube 40, a hole 52 in a normally bowed disk 53, and a hole 54 in the head 37, the gas pressure is transmitted to the space c surrounding both of the bellows 33, 34.

A coiled spring 55 acts in compression between the washer 43 and an abutment 56 in the form of a nut threaded onto a screw 57 whose head 58 is sealed in the casing end and thus accessible for convenient adjustment of the spring force which herein is supplemented by that of a spring 55' compressed between the ring 35 and the tube 40. The latter and the connected ends of the two bellows are thus urged toward the valve seat 47. As a result, the valve will be closed whenever the pressure P5 is below the resultant force due to the gas pressure P3 combined with the force of the spring 55 and 55'. Conversely, when the pressure P5 rises above P3 by a value determined by the spring force the valve 31 will be opened.

Liquid under a pressure P1 is supplied continuously to the passage 32 from a source such as a pump 59 capable of developing a pressure substantially higher, for example 25 p.s.i. higher, than the maximum value of the pressure P3 to be measured plus the pressure due to the springs 55, 55', the latter being 85 p.s.i. for example. A restriction 60 in the pump outlet limits the flow to the passage 32 at a rate such that when the valve 31 is wide open, the pressure differential across the valve 31 is substantially zero. It will be apparent therefore that the opening of the valve will increase and decrease alternately and continuously. That is to say, when the valve opening is very small, the pressure P5 will rise within the bellows 33 until it overcomes the prevailing pressure P3 and the spring force whereupon the valve will open further to permit liquid to escape to the outlet 48. This prevents the pressure P5 from increasing above the value established by the springs and the prevailing gas pressure P3. The pressure P5 thus decreases until P3 plus the spring force overcomes P5 whereupon the valve is moved toward closed position. As a result of such alternate increasing and decreasing of the valve opening, the pressure P5 is regulated and maintained at or near a value equal to P3 plus the increment due to the springs. The pressure P5 is thus regulated and closely follows the changes in P3, the deviation usually being no more than 5 p.s.i. over the full operating range.

To sense the changes in P5 and position the valve plunger 19 correspondingly, the plunger cylinder or sleeve 20 communicates with the passage 32, and a piston 61 on the adjacent end of the plunger is exposed to the liquid at the controlled pressure P5. The total pressure on the plunger is opposed by the force of the feed back spring 23 and also by a biasing pressure P6 which is maintained constant at all times and herein acts on a piston 62 on the opposite end of the plunger. This piston is exposed to liquid under pressure in a space 63 continuously supplied from a suitable pressure source and having outlet 64 from which the liquid may escape to a low pressure space under the control of an automatic regulating valve 65. The latter comprises a seat 66 surrounding the outlet and coacting with a disk 67 whose stem 68 is clamped to and guided axially by apertured disks 69 like the disk 41.

Where, as here, it is desired to measure the absolute value of P3, the valve member 67 is moved by an actuator 70 responsive to pressure changes in the space 63 with reference to absolute zero. For this purpose, the actuator is disposed in a casing 71 which is part of the space 63 and includes a bellows 72 anchored and sealed at one end to the valve casing and at the other end to the valve stem. A compression spring 73 stressed to correspond to the desired value of P6 is disposed within the bellows which communicates with an evacuated space 74. The spring is stressed to maintain the biasing pressure at a value, for example 65 p.s.i., well above the low pressure or drain area with which the outlet 64 communicates.

The liquid escaping through the main regulating valve 31 is utilized as a convenient source of pressure for the plunger biasing system since the pressure in the outlet will always be substantially above the required biasing pressure. For this purpose, the outlet 48 is connected directly to the space 63.

Assuming a biasing pressure of 65 p.s.i. absolute, the valve 65 will remain closed whenever the pressure is below this value. As liquid continues to escape through the valve 31, the pressure P6 will rise eventually overcoming the spring 73 and further opening the valve 65 to permit liquid to escape to the outlet 64 until P6 has returned to 65 p.s.i. As a result, the opening of the valve 65 is increased and decreased alternately in the same manner as the valve 31 so as to maintain the pressure P6.

As a safety measure, provision is made for regulating the pressure in the space 63 in the event of rupture of the bellows 72. This is accomplished by a valve plunger 75 slidable in a cylinder 76 and coacting with a seat 77 surrounding a branch 78 of the space 63. A land 79 on the plunger coacts with an outlet port 80 to form an auxiliary regulating valve 81. A spring 82 urges the plunger toward the seat and is stressed to hold the valve closed against the normally maintained value of P6 acting on the exposed end of the plunger.

When P6 rises to an abnormally high value for example 70 p.s.i. determined by the force of the spring 82, the plunger is moved away from the seat 77 whereupon the pressure P6 acts on the full end area of the plunger. This causes the plunger to move past the output port 80 permitting liquid to escape until P6 has been reduced to a value, for example 65 p.s.i., determined by the stressing of the spring 82. The valve 81 is then operated in the same manner as the valve 65 to continue the regulation of the biasing pressure.

It will be apparent from the foregoing that the bellows 33, 34 constitute diaphragms having flexible portions or movable walls coupled together by the tubes 39, 40 and arranged to actuate the valve 31. These diaphragms divide the casing 30 into first and second chambers $a$ and $b$ within the bellows 34 and 33 and a third surrounding chamber $c$ separated from the chamber $a$ by the bellows 34 and from the chamber $b$ by the bellows 33.

In accordance with another aspect of the present invention and as a further safety measure, provision is made for normally maintaining the valve 31 in control of one of the diaphragms, in this instance the bellows 33 and then, in the event of rupture of the latter, automatically transferring the control of the valve 31 to the other diaphragm alone. This is accomplished through the action of a valve 85 which is normally maintained open but which when closed isolates the interior of the bellows 34 from the outer space $c$ surrounding the bellows 33 and 34. Herein the valve 85 is formed by the disk-like diaphragm 52 coacting with a seat 86 defined by the inner end of the tube 40. The outer periphery of the disk is clamped between the heads 37, 38 and a spring 87 acts in compression to bow the disk axially and normally hold it away from the seat 86 as shown in Fig. 1. As a result, the hole 52 in the disk normally establishes communication between the outer chamber $c$ and gas chamber $a$.

Now, in case of rupture of the bellows 33 permitting liquid at the pressure P5 to leak out of the chamber $b$ into the chamber $c$ so as to fill the latter, the resulting higher pressure in the chamber $c$ will act on the diaphragm 53 to overcome the spring 87 and not only flatten the diaphragm but also flex the same reversely as shown in Fig. 2. Thus, the diaphragm is forced against the seat closing the valve 85 thereby preventing the further flow of gas through the hole 52. Thereafter, the movements of the valve member 46 will be controlled solely by the pressure difference between the gas inside the bellows 34 and the liquid surrounding the latter, the pressures inside and outside of the ruptured diaphragm being equal.

The ruptured condition of the diaphragm 33 may be indicated in various ways. As for example by the provision of a window in the casing 30 through which the presence of liquid outside of the bellows may be observed. Another and preferred way is to indicate the difference in pressure which exists in the outer space $c$ during normal operation when the bellows 33 is effective as compared to the higher pressure in this space which becomes filled with liquid following rupture of the bellows 33. This may be accomplished by an ordinary pressure gage 90 attached to the end of a pipe 91 threaded into an opening in the casing 30.

From the foregoing, it will be apparent that during normal operation changes in the gas pressure P3 to be measured are transmitted to the chamber $a$ within the bellows 34 and to the chamber $c$ surrounding both of the bellows while the controlled liquid pressure is applied to the chamber $b$ within the bellows 33. The gas pressure is supplemented by the force of the springs 55, 55' which may for example amount to 85 p.s.i. Therefore, whenever the value of P3 plus the spring force equals the controlled pressure P5, the oppositely directed forces acting on the valve member 46 will balance each other and the valve opening will remain fixed. While P3 remains constant, P5 will increase and decrease alternately thus increasing and decreasing the opening of the valve 31 as above described whereby to maintain P5 within a narrow range corresponding to P3.

In response to an increase in P3, the force tending to close the valve 31 will be increased correspondingly so that the regulating action of the valve establishes a correspondingly higher value of P5. Conversely, a lower pressure P5 will be maintained when the pressure P3 falls. At all times, the controlled pressure of the liquid in the passage 32 corresponds closely to the gas pressure P3.

Since the biasing pressure acting on the plunger 19 is maintained at a constant value, the plunger will be moved back and forth in response to changes in P5. The pilot valve is thus opened or closed to increase or decrease the energization of the servo 11. The accompanying movement of the servo piston 13 correspondingly changes the stress of the feed back spring 23 in a direction to return the valve plunger to centered position. When this restoring force plus the biasing pressure P6 balance the force due to the prevailing value of P5, the plunger will be recentered and the pilot valve closed thus stopping the reversible servo piston 13 of the latter in a position corresponding precisely to the prevailing value of P5.

With the arrangement above described, it will be apparent that the active bellows 33 or 34 is subjected only to the difference between the pressures P3 and P5 rather than to the full value of P3. The danger of rupturing the bellows is correspondingly reduced.

I claim as my invention:

1. The combination of, a casing, axially spaced first and second bellows in said casing having closed adjacent ends connected together and remote ends sealed to opposite ends of said casing whereby to define first and second chambers within the respective bellows and a third chamber surrounding the two bellows, means for connecting said first chamber with a source of gas whose pressure is to be measured, a liquid filled passage continuously supplied with liquid under pressure and communicating with said second chamber, a valve controlling the escape of liquid from said passage and coupled to said closed bellows ends so as to vary the valve opening with changes in the pressure differential between said first and second chambers and maintain the pressure in said passage at a value corresponding to the prevailing gas pressure, a second valve normally establishing communication between said first and third chambers, and a pressure responsive actuator for said second valve adapted to close the latter automatically in response to the leakage of liquid from said second chamber into said third chamber.

2. A pressure sensing device as defined in claim 1 in which said second valve comprises a seat carried by said second bellows coacting with a diaphragm spring urged away from said seat and moved against the latter by a build up of pressure in said third chamber.

3. The combination of, a casing, means dividing said casing into first, second and third chambers including a first flexible diaphragm separating said first and third chambers and a second flexible diaphragm separating the second and third chambers, means connecting said first chamber with a source of gas whose pressure is to be measured, a liquid filled passage communicating with said second chamber and continuously supplied with liquid under pressure, a valve regulating the escape of liquid out of said passage and including a member coupled to the movable parts of both of said diaphragms whereby the valve opening is increased and decreased to maintain a pressure in said passage corresponding to the prevailing value of the gas pressure, a normally open second valve establishing communication between said first and third chambers whereby to place said first valve in control of said first diaphragm, and means responsive to a pressure change in said third chamber due to leakage of said liquid through said second diaphragm to close said second valve and thereby place said first diaphragm in control of said first valve.

4. In a device for measuring changes in the pressure of a gas, the combination of, means defining a passage continuously supplied with liquid under pressure, a valve adapted when open to permit the escape of liquid out of said passage and opened and closed automatically as the pressure of the liquid rises above and falls below a predetermined value corresponding to the prevailing pressure of said gas, a control device having a plunger with oppositely facing pressure areas thereon, one of said areas being exposed to the liquid in said passage so as to move the plunger back and forth with pressure changes in the passage, means defining a space around said second area continuously supplied with liquid under pressure, a valve controlling the escape of liquid out of said space and having a movable element, an actuator for said second valve including a spring loaded evacuated bellows urging said movable element toward closed position, and a power servo controlled by said device and having a driven element variably positioned in accordance with the prevailing value of the pressure in said passage.

5. The combination defined by claim 4 in which said liquid space communicates with the discharge side of said first valve.

6. The combination defined by claim 4 including a third valve controlling the escape of liquid from said space, an actuator for said third valve including a spring loaded plunger exposed to the pressure in said space and movable to open said valve when such pressure rises to a predetermined value above the pressure normally maintained in said space by said second valve.

7. In a device for measuring changes in the pressure of a gas, the combination of, means defining a passage continuously supplied with liquid under pressure, a valve adapted when open to permit the escape of liquid out of said passage and opened and closed automatically as the pressure of the liquid rises above and falls below a predetermined value corresponding to the prevailing pressure of said gas, a control device having a member movable back and forth with pressure changes in the passage, a reversible power servo having a driven element and energized selectively in response to movements of said device in opposite directions out of a predetermined centered position, means exerting on said member a constant force acting in a direction opposing the pressure in said passage, a feed back spring urging said member in said direction, means actuated by said servo element and variably stressing said spring to supplement said constant force and rebalance the opposing forces acting on said device.

8. The combination of, a casing, means dividing said casing into first, second and third chambers including a first flexible diaphragm separating said first and third chambers and a second flexible diaphragm separating the second and third chambers, means connecting said first chamber with a source of gas whose pressure is to be measured, a liquid filled passage communicating with said second chamber and continuously supplied with liquid under pressure, a valve regulating the escape of liquid out of said passage and including a member coupled to the movable parts of both of said diaphragms whereby the valve opening is increased and decreased to maintain a pressure in said passage corresponding to the prevailing value of the gas pressure, and valve means automatically responsive to a pressure change in said third chamber due to leakage of said liquid through said second diaphragm to transfer the control of said first valve from said second diaphragm to said first diaphragm.

References Cited in the file of this patent

UNITED STATES PATENTS

| | | |
|---|---|---|
| 2,312,201 | Thompson et al. | Feb. 23, 1943 |
| 2,556,436 | Moore | June 12, 1951 |
| 2,600,777 | Johnson | June 17, 1952 |
| 2,699,102 | Doyle | Jan. 11, 1953 |
| 2,715,311 | Coar | Aug. 16, 1955 |
| 2,738,771 | Rosenberger | Mar. 20, 1956 |
| 2,742,916 | Side | Apr. 24, 1956 |
| 2,754,843 | Hauber | July 17, 1956 |
| 2,775,254 | Stanbury | Dec. 25, 1956 |
| 2,789,543 | Popowsky | Apr. 23, 1957 |
| 2,813,519 | Persson | Nov. 19, 1957 |

FOREIGN PATENTS

| | | |
|---|---|---|
| 749,542 | Germany | Mar. 4, 1944 |